United States Patent

[11] 3,612,307

| [72] | Inventor | Clarence W. Vogt<br>Box 232, Weston, Conn. 06880 |
|---|---|---|
| [21] | Appl. No. | 794,627 |
| [22] | Filed | Jan. 28, 1969 |
| [45] | Patented | Oct. 12, 1971 |

[54] FEEDER AND LINER ASSEMBLY THEREFOR
10 Claims, 10 Drawing Figs.

[52] U.S. Cl. ........................................ 214/17 CC,
222/368
[51] Int. Cl. ...................................... B65g 65/32
[50] Field of Search........................................ 214/17
(.68); 302/49; 222/368; 198/211

[56] References Cited
UNITED STATES PATENTS
2,921,721  1/1960  Brooks ........................ 302/49 UX
3,250,406  5/1966  Long et al. .................... 214/17 (.68)
3,446,404  5/1969  Mehta .......................... 222/368 X

*Primary Examiner*—Robert G. Sheridan
*Attorney*—Diller, Brown, Ramik & Holt

ABSTRACT: This disclosure relates to a rotary feeder of the pressure differential type which includes a housing having a cylindrical cavity therein with an inlet and an outlet opening thereinto, a rotor mounted within the cavity for rotation relative to the housing, and a fixed stator telescoped within the rotor and supported by the housing. The rotor is provided with a plurality of circumferentially adjacent pockets in which liners are positioned. The liners are separately formed and then bonded together in situ to form a continuous liner assembly having exposed surfaces engageable with the housing to form a seal therewith between the inlet and the outlet. The stator is in the form of a valve, which is preferably formed of a stable plastic and which controls the flow of gases into and out of the pockets as the rotor rotates.

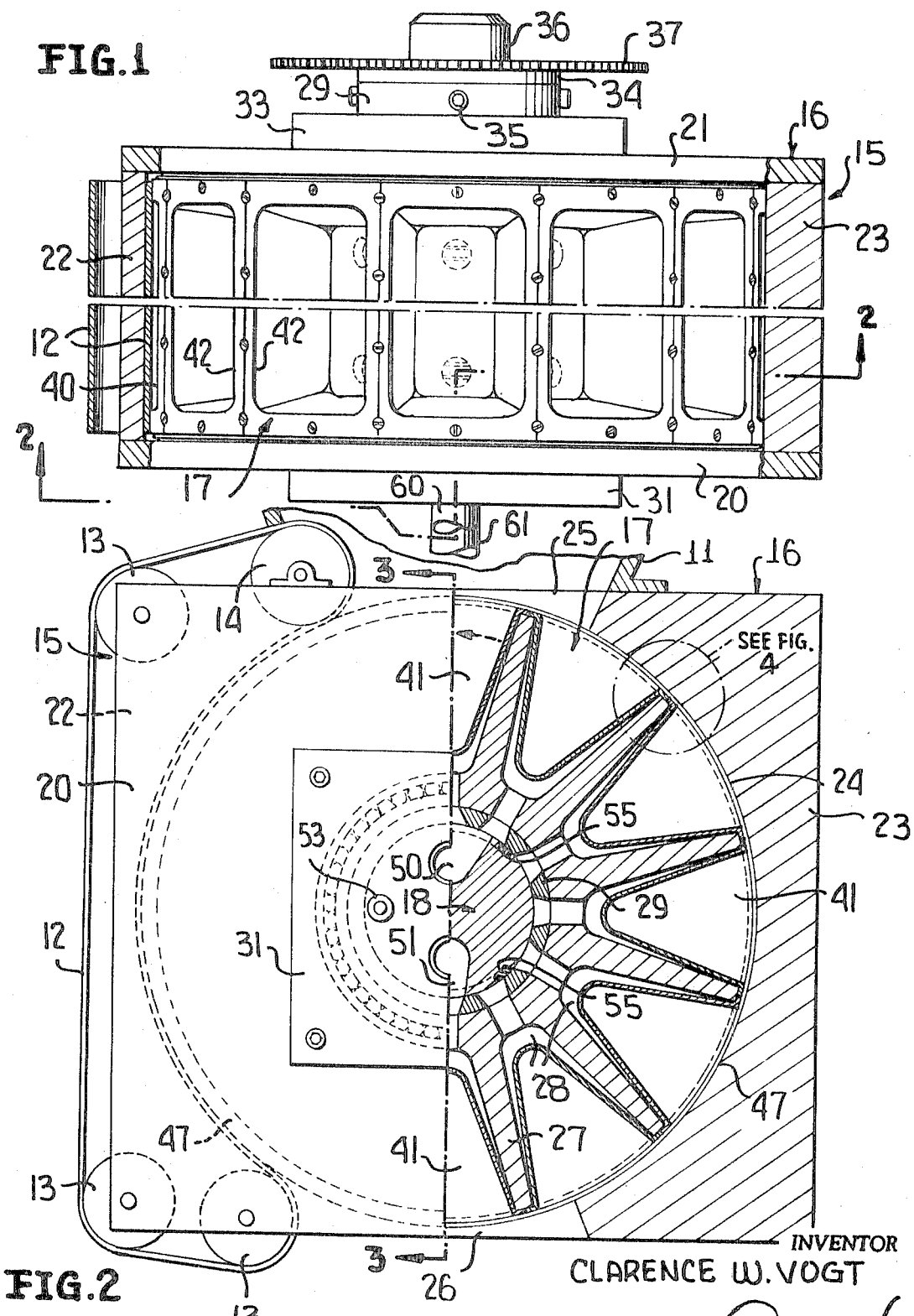

INVENTOR
CLARENCE W. VOGT

ATTORNEYS

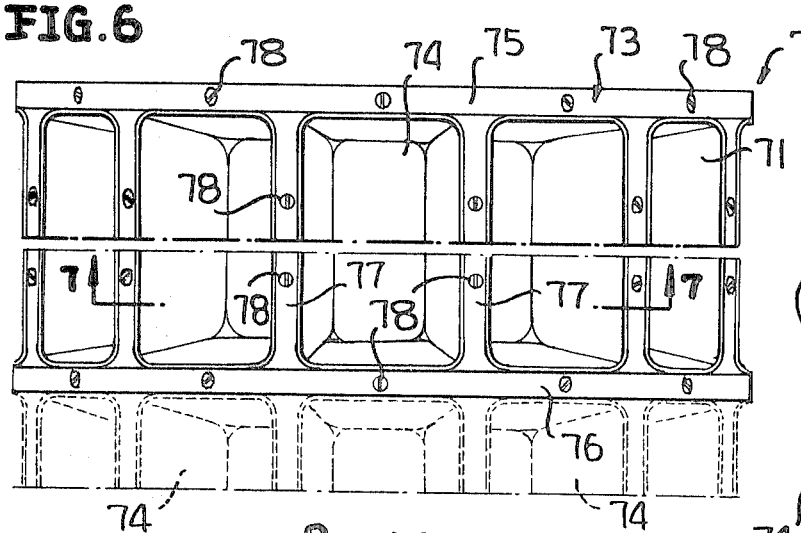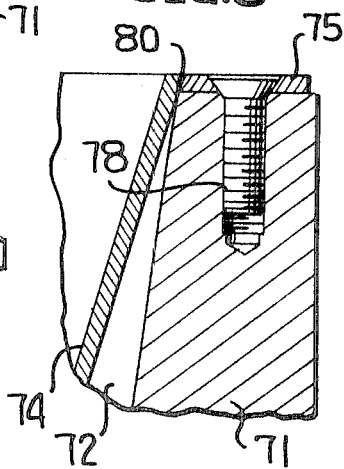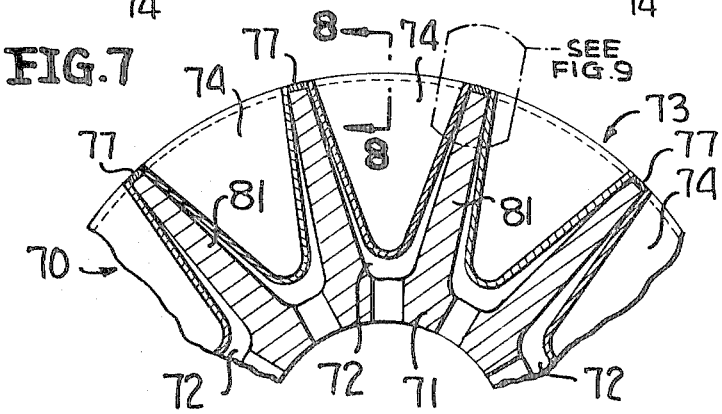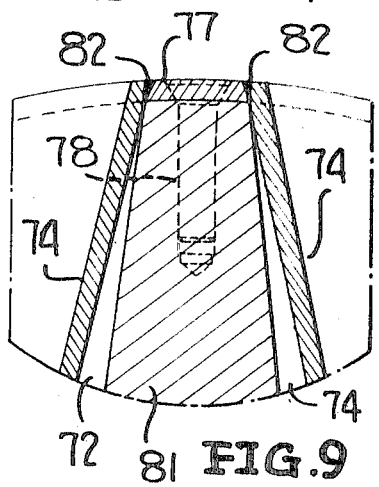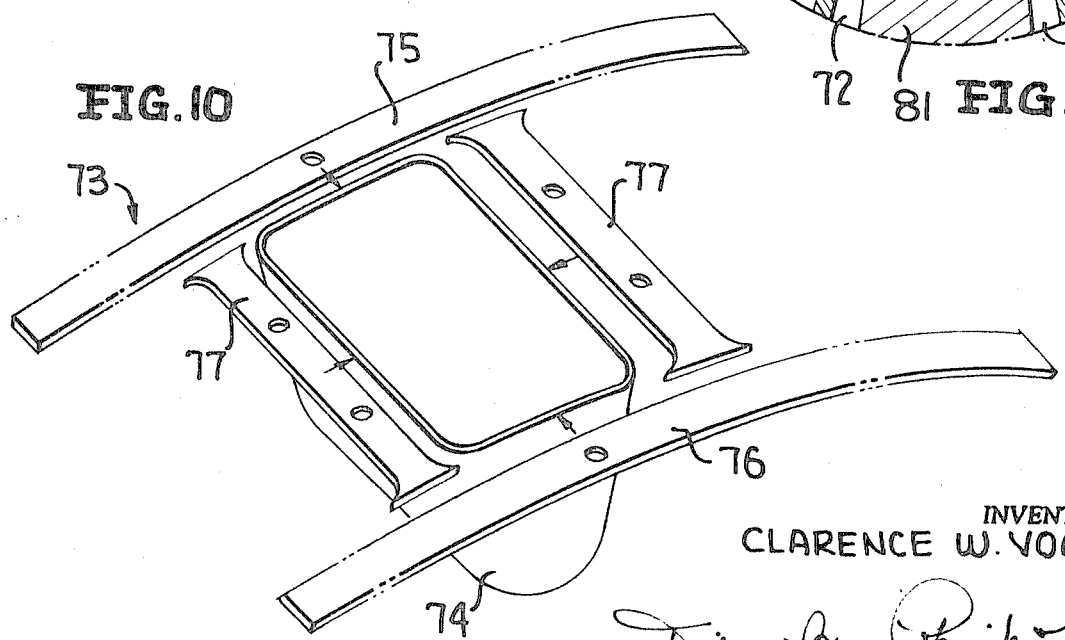

FEEDER AND LINER ASSEMBLY THEREFOR

This invention relates in general to new and useful improvements in feeders, and more particularly to a feeder which includes a rotating rotor which is mounted in sealed relation within a housing.

In accordance with this invention, the rotor is formed of a plurality of radially outwardly opening pockets which are disposed in circumferentially adjacent relation. In each of the pockets there is positioned a porous liner which freely passes gases while restraining the flow of materials therethrough. In the past, these liners have been individually formed and then individually secured in place in the rotor. However, this has presented a problem both as to mounting of the liners and the forming of seals between the individual pockets and the housing as the rotor rotates. In accordance with this invention, both problems have been overcome by the simple expedient of bonding together the liners in situ whereby the liners present a continuous peripheral surface for forming a seal and wherein a minimum of fasteners are required to fixedly secure the composite liner assembly to the rotor.

In accordance with this invention, the liners may either be formed with the integral flanges and wherein the flanges are of sufficient extent to define the necessary peripheral sealing surfaces with adjacent flanges being in edge abutting relation and bonded together, such as by welding.

In another form of the invention, the liners may be formed without flanges. This greatly facilitates the forming of the liners from porous sheet material and provides for a better liner shape control. In such event, the peripheral surface portion of the liner assembly is in the form of circumferential and longitudinal strips which are positioned about the periphery of the rotor and bonded in situ to one another and to the outer edges of the liners.

A still further feature of this invention is to provide an effective seal between the ends of the rotor and the housing at the ends of the cavity, the housing being provided with suitable continuous sealing rings which are seated in grooves in the housing and which are compressively engaged by the ends of the rotor, the sealing members being preferably formed of a suitable inert resilient plastic material.

A further feature of the feeder of this invention is the formation of the stator thereof of a stable plastic material and wherein the rotor is preferably formed with an interior sleeve which is in sealing engagement with the stator and wherein the sleeve may be selectively formed of metal or plastic materials other then the plastic materials of the stator so as to reduce both friction and wear.

With the above and other objects in view that will hereinafter appear, the nature of the invention will be more clearly understood by reference to the following detailed description, the appended claimed subject matter, and the several views illustrated in the accompanying drawings.

IN THE DRAWINGS:

FIG. 1 is a plan view of the feeder with portions of the housing thereof broken away and shown in section to more clearly illustrate the specific details of the rotor.

FIG. 2 is an elevational view of the feeder with a portion thereof broken away and shown in section along the line 2—2 of FIG. 1.

FIG. 6 is a plan view of a modified form of rotor and shows the specific constructional details thereof.

FIG. 7 is an enlarged fragmentary transverse vertical sectional view taken along the lines 7—7 of FIG. 6 and shows specifically the construction of the liner assembly thereof.

FIG. 8 is an enlarged fragmentary longitudinal vertical sectional view taken along the line 8—8 of FIG. 7 and shows one connection between a liner and an adjacent flange portion thereof.

FIG. 9 is an enlarged fragmentary sectional view showing the details of that portion of the rotor indicated in FIG. 7.

FIG. 10 is a fragmentary exploded perspective view showing certain of the components of the liner assembly and the relationship thereof to one another.

Figure 3:
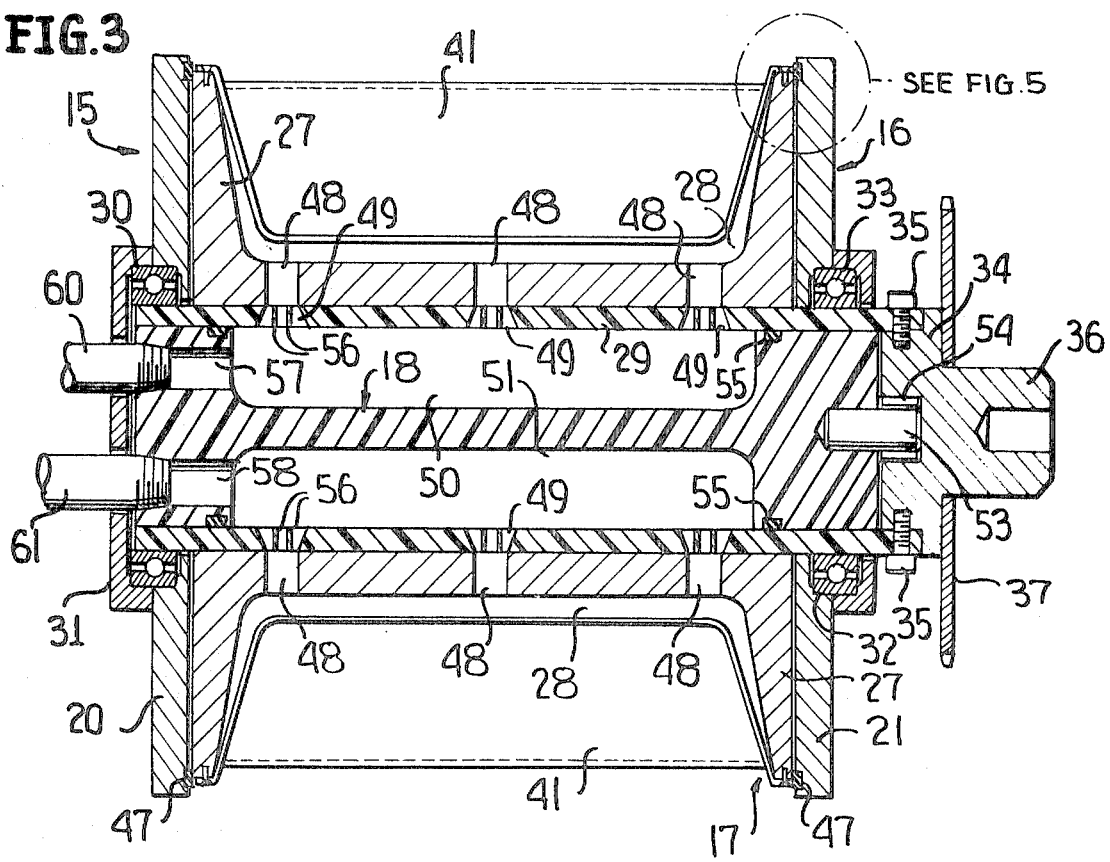
FIG. 3 is a vertical longitudinal sectional view taken along the line 3—3 of FIG. 2 and shows further the specific constructional details of the feeder.

Referring now to the drawings in detail, it will be seen that there is illustrated in FIGS. 1, 2 and 3 a feeder formed in accordance with this invention and incorporating specific details of this invention, the feeder being generally referred to by the numeral 15. Basically, the feeder 15 includes a housing, which is generally referred to by the numeral 16, a rotor, which is generally referred to by the numeral 17, and a stator, which is generally referred to by the numeral 18.

With particular reference to FIGS. 1 and 2, it will be seen that the housing 16 is formed of two spaced parallel sideplates 20 and 21 which are connected together by a pair of inserts 22 and 23, the end plates 20 and 21 and the inserts 22 and 23 combining to define a cylindrical chamber 24 having an inlet 25 and an outlet 26.

The rotor 17 includes a rotor body 27, which may be readily formed such as by casting, and which is provided in the exterior thereof with a plurality of circumferentially adjacent pockets 28 which open radially outwardly. The general configuration of the pockets 28 is best shown in FIGS. 1 and 2.

Referring now to FIG. 3 in particular, it will be seen that the rotor body 27 is hollow and is suitably carried by a sleeve member 29. The sleeve member 29 has end portions which are suitably rotatably supported within and for rotation relative to the housing 16. The sleeve 29 is supported at the left end thereof, as viewed in FIG. 3, by means of a bearing 30 which is suitably seated in the end plate 20 and is retained in place by means of a cap 31. The opposite end of the sleeve member 29 is supported for rotation by means of a bearing 32, which may be identical with the bearing 30, supported by the end plate 21 and secured in place relative thereto by means of an end cap 33.

It is to be noted that the sleeve 29 functions as the support for the rotor body 27 whereby the rotor 17 is accurately positioned within the cavity 24 of the housing 16.

At this time it is also pointed out that the right end of the sleeve member 29, as viewed in FIG. 3, is provided with a plug 34 which is telescoped within the sleeve member 29 and is secured in place by suitable radially extending fasteners 35. The plug 34 is provided with a shaft portion 36 of a reduced diameter and which shaft portion 36 has suitably secured thereon a sprocket 37 for the purpose of facilitating the rotation of the rotor 17.

Figure 4:
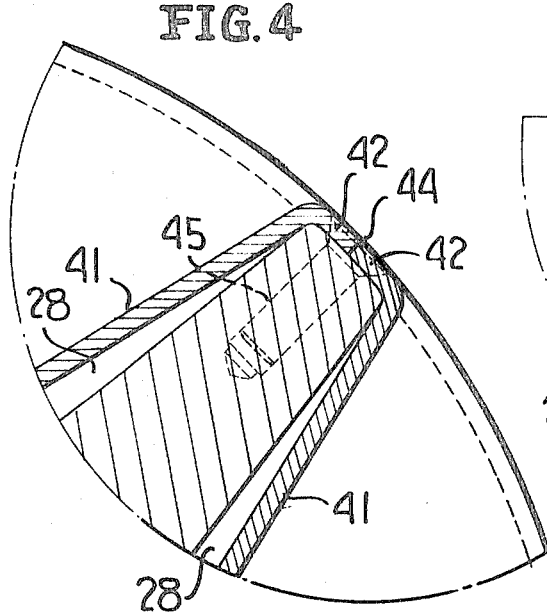
FIG. 4 is an enlarged fragmentary sectional view of the rotor showing that portion identified in FIG. 2.
Figure 5:
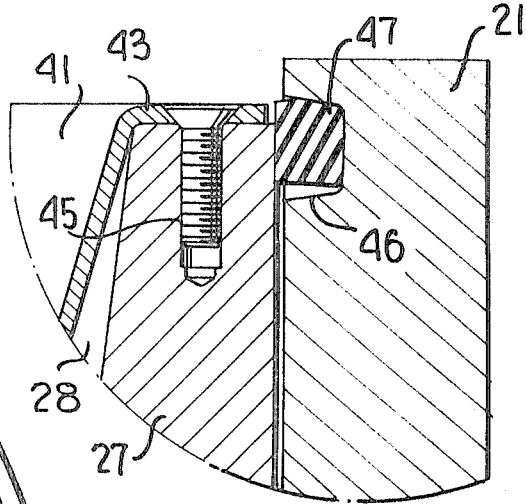
FIG. 5 is an enlarged fragmentary axial sectional view taken through that portion of the feeder indicated in FIG. 3 and shows the construction of an end seal between the rotor and the housing.

Referring now to FIGS. 1, 4 and 5 in particular, it will be seen that the rotor 17 carries a continuous liner assembly which is generally referred to by the numeral 40. The liner assembly 40 includes a plurality of liners 41, there being one liner 41 for each of the pockets 28. Each liner 41 is generally basket-shaped in outline and the open end thereof is defined by a peripheral flange which includes a pair of axially extending flange portions 42 (FIG. 4) and a pair of circumferentially extending flange portions 43 (FIG. 5). It is to be understood that the flange portions 43 seat on the periphery of the rotor body 27 and serve to support the liners 41 in the pockets 28 without the liners 41 touching the walls of the pockets 28. This is clearly shown in FIG. 3.

As is clearly shown in FIGS. 1 and 4, the axially extending flange portions 42 of adjacent liners 41 are of a sufficient circumferential extent so as to be in abutting engagement when the liners 41 are properly positioned. The abutting edges of the flange portions 42 are then bonded together as at 44 (FIG. 4) such as by welding. When a welding technique is utilized to bond together the abutting edges of the flange portions 42, it is preferred that the welding technique be of a high frequency induction heating type whereby the application of heat to the liners 41 may be controlled so as to localize the heating effect thereof.

It will be readily apparent that when the liners 41 are bonded together in the manner described above, the liners 41 define one continuous liner assembly. This liner assembly is preferably formed in situ and is readily secured in place by a plurality of circumferentially and axially spaced fasteners 45 which are threaded into the rotor body 27 and have countersunk heads.

Referring now to FIG. 2 in particular, it will be seen that there is associated with the housing 16 a hopper 11 for directing material to be handled by the feeder 15 into the inlet 25. In addition, there is associated with the hopper 11 and the housing 16 an endless belt 12 which is intended to form a seal with the external surface of the rotor 17 between the inlet 25 and the outlet 26 in the direction of rotation of the rotor 17.

The endless belt 12 is supported by a plurality of support rollers 13 and 14 so that a portion thereof is in constant wrapping engagement with the exterior surface of the rotor 17 within the housing 16 and the remainder thereof is disposed outwardly of the housing 16. The support roller 14 is particularly positioned so that the endless belt 12 extends into the hopper 11 and cooperates with the rotor 17 so as to assure the complete filling of the liners 41 and the pinching off of the material flowing into the liners.

It is to be particularly noted that the flange portions 42 and 43 of the liner assembly readily form a seal with the endless belt 12 whereby the pockets 28 and their respective liners 41 are sealed relative to the housing 16 when the pockets and liners are moving between the inlet 25 and the outlet 26.

Referring now to FIGS. 1 and 5 in particular, it will be seen that the end plates 20 and 21 are provided with circular grooves 46 opposing the peripheral portions of the ends of the rotor body 25. In each of the circular grooves 46 there is seated in an annular sealing member 47 which is preferably formed of a slightly compressible friction resisting plastic, such as nylon or tetraflouroethylene. When the rotor 17 is properly seated within the housing 16, the end portions of the rotor body 27 will compressively engage the sealing members 47 so as to slightly compress the same whereby the sealing members 47 are in constant pressure engagement with the ends of the rotor body 27 and form a seal therewith. In this manner, when finely divided materials are being handled by the feeder 15, the materials will not be able to enter in between the ends of the rotor 17 and the end plates 20, 21 of the housing 16.

Referring once again to FIG. 3 in particular, it will be seen that the rotor body 27 is provided with a plurality of inwardly extending radial ports 48 which open radially inwardly from the bottom of each of the pockets 28 into aligned flaring ports 49 formed in the sleeve member 29.

The stator 18 is in the form of a fixed valve member having a pair of generally diametrically opposite, axially extending ports 50 and 51 formed therein. The port 50 generally faces the inlet 25 while the port 51 generally faces the outlet 26. As is clearly shown in FIG. 2, the stator 18 is fixed against rotation by means of a fastener 52 extending through the end cap 31 and being threaded into the end of the stator 18. In addition, as is shown in FIG. 3, the right-hand end of the stator 18 is provided with a supporting shaft 53 which extends into the plug 34 and is engaged by a suitable bearing 54 carried by the plug 34. Thus, the stator 18 is stabilized within the moving components of the feeder 15.

In order to form a seal between the stator 18 and the sleeve member 29, the stator 18 is provided with a pair of sealing members 55. Each sealing member 55 extends longitudinally on opposite sides of the respective port and circumferentially at the ends of the respective port, as is clearly shown in FIG. 2.

In order to facilitate the movement of the sleeve member 29 over the sealing members 55 in the area of the ports 49 thereof, each port 49 is provided with a plurality of circumferentially extending bars 56 which bridge across the port 49, as is clearly shown in FIG. 3.

The left end of the stator 18, as is shown in FIG. 3, is provided with a port 57 which opens into the passage 50 and a port 58 which opens into the passage 51. The port 57 has threaded thereinto a vacuum line 60 which passes through the end cap 31. In a like manner, a pressure line 61 passes through the end cap 31 and is threaded into the port 58. Thus when a pocket 28 of the rotor 17 is aligned with the inlet 25, a vacuum is drawn therein and through the liner 41, which liner is formed of a porous material through which gases freely pass, but which excludes the passage of finely divided materials. This facilitates the drawing of material into each pocket 28 as it passes the inlet 25. The drawing of a vacuum in the pocket 28 through the liner 41 into the interior of the liner results in a removal of a very large percentage of entrapped gases in the material passing into the liner 41 with the result that the material is compacted in the liner. Then, as the filled liner or pocket passes beyond the inlet and the ports 48 associated therewith pass out of communication with the passage 50, the material will still remain within the liner 41 and not be thrown radially outwardly therefrom. As the filled liner comes into alignment with the outlet 26, the ports 48 associated therewith come into communication with the passage 51 with the result that air or other gas under pressure is directed into the respective pocket 48 and through the porous liner 41 so as to forcibly discharge the compacted material therefrom.

At this time it is also pointed out that in order to reduce friction between the stator 18 and the sleeve member 28, the stator 18 may be formed of a suitable stable plastic, such as "Delrin." In addition, it may be advisable to form the sleeve member 29 of a suitable plastic material which is compatible with the material of the stator 18 to facilitate reduction in friction.

Reference is now made to FIGS. 6 through 10, inclusive, wherein there is illustrated a modified form of rotor assembly which is identified by the numeral 70. The rotor assembly 70 includes a rotor body 71 which may be identical with the rotor body 27. The rotor body 71 has a plurality of radially outwardly opening, circumferentially adjacent pockets 72 formed therein. As is clearly shown in FIG. 6, the pockets 72 may be arranged in either a single row or in multiple rows with the rows being axially adjacent and the individual pockets axially aligned.

The rotor assembly 70 also includes a liner assembly, which is generally identified by the numeral 73. As is best shown in FIG. 10, the liner assembly 73 includes a plurality of liners 74 which are specifically configurated for reception in the pockets 72. It is to be noted that each liner 74 is devoid of a peripheral flange at the open end thereof. It has been found in the past that with the desired porous material which is to be utilized, which porous material is applied in sheet form, it is extremely difficult to provide the necessary sharp bend between the liner and the peripheral flange defining the open end thereof without distorting the liner proper. Inasmuch as it is highly desirable that each liner be of the same volumetric capacity, in many instances it has been found that it is impractical, if not impossible, to form the liner with a peripheral flange.

In accordance with this invention, the equivalent of the peripheral flange for the liner 74 is provided in the form of individual strips. These strips include a pair of circumferentially extending strips 75 and 76 and a plurality of axially extending strips 77. It will be readily apparent from FIGS. 6 and 10 that the strips 75, 76 and 77 combine to define a continuous peripheral flange for the liners 74.

Referring now to FIG. 8 in particular, it will be seen that the circumferentially extending strip or flange 75 is firmly seated on the rotor body 71 and is suitably secured thereto by means of fasteners 78 which are threaded into the rotor body 71 and which have the heads thereof recessed into the material of the strips 75. It is to be understood that the strip 75 as well as the strip 76, is applied to the rotor body 71 in a manner wherein the opposite ends thereof are in abutting engagement. The liner 74 is then seated in its respective pocket 72 and is bonded along its side edges to the strips 75 and 76 as at 80. This bond is preferably in the form of a weld.

Referring now to FIG. 9, it will be seen that there is illustrated a typical connection between a strip or flange 77 and a pair of liners 74. Like the strips 75 and 76, the strips 77 are applied to the rotor body 71 along the transversely extending ribs 81 thereof prior to the positioning of the liner 74 within their respective pockets 72. The strips or flanges 77 are also secured in place by means of threaded fasteners 78.

After the axially extending strips 77, which are contoured in accordance with the contour of the liners 74, are positioned, the liners 74 are placed within their respective pockets 72 in the position clearly shown in FIG. 7. Thereafter, each liner 74 is bonded to a respective strip 77 as at 82, the bond preferably being formed by welding.

At this time it is pointed out that the material of the strips 75, 76 and 77 need not be the same as that of the liners 74. It will be readily apparent that the liners 74 must be formed of a porous material through which gases will readily pass but wherein passage of finely divided material is excluded. On the other hand, it is not necessary for the strips 75, 76 and 77 to be porous. It is, however, highly desirably that the strips 75, 76 and 77 be formed of a suitable material which has both slip properties and sealing properties inasmuch as these strips, when bonded together, define a peripheral surface on the rotor assembly 70 which is engaged with the surface of the continuous belt 12 to provide a seal between the housing 16 and the respective pockets 72.

It is also pointed out here that the welding together of the liners and the strips may be accomplished in any desired manner, although it is highly preferred that the welding be of a high frequency welding type and preferably that the welding be an induction-type welding process wherein the rotor body 71 is utilized in the generation of heat and the conduction of the desired heat to the various parts being joined to effect the necessary weld.

With particular reference to FIG. 6, while the rotor assembly 70 illustrated therein is primarily shown as being of a single row of pocket type, it is to be understood that the rotor assembly 70 may be provided with multiple rows of pockets. If there are more than one row of pockets, it will be necessary to provide additional circumferential strips other than the strips 75 and 76 illustrated. In such event, the strip 76, for example, will function as a circumferential flange for two rows of liners.

It is to be readily apparent that the liner assemblies 40 and 73 have their independent advantages. The liner assembly 40 is more readily formed, but as is explained above, the liners 41 thereof cannot be as accurately shaped due to the integral flanges. On the other hand, the liner assembly 73 is more difficult to form because of the numerous components thereof. However, it has the advantage of a liner configuration which may be accurately formed coupled with the fact that the flange forming portions thereof need not be of the same material as the liners.

Although only several preferred embodiments of the invention have been specifically described herein, it is to be understood that minor variations may be made in the feeder construction without departing from the spirit of the invention.

I claim:
1. A rotor assembly for a feeder of the pressure differential type comprising a rotor having a plurality of radially opening and circumferentially adjacent pockets, and a porous liner in each pocket, said liners being continuously interconnected in a generally cylindrical form, each pocket being defined by an encircling peripheral surface portion of said rotor, each liner having associated therewith a peripheral flange, and means clamping said peripheral flange against said rotor peripheral surface.

2. The rotor assembly of claim 1 wherein each liner is separately formed and said peripheral flange is formed integrally with each liner, and adjacent peripheral flanges of adjacent liners are bonded together.

3. The rotor assembly of claim 1 wherein each liner is separately formed and peripheral flanges of said liners are defined by circumferential and axial strips separately bonded to peripheral edge portions of said liners.

4. A rotor assembly for a feeder of the pressure differential type comprising a rotor having a plurality of radially opening and circumferentially adjacent pockets, and a porous liner in each pocket, said liners being continuously interconnected in a generally cylindrical form, said liners being separately formed and welded together.

5. A rotor assembly for a feeder of the pressure differential type comprising a rotor having a plurality of radially opening and circumferentially adjacent pockets, and a porous liner in each pocket, said liners being continuously interconnected in a generally cylindrical form, said interconnected liners having bonded together flanges defining a continuous sealing surface for sealing the peripheral surface of said rotor assembly relative to a supporting housing.

6. The rotor assembly of claim 5 wherein said liners are formed of a plastic material having good slip characteristics relative to metal surfaces.

7. A feeder of the pressure differential type comprising a housing having a generally cylindrical chamber and circumferentially spaced inlet and outlet opening into said chamber, a hollow rotor positioned in said chamber and being mounted for rotation relative to said housing, said rotor having a plurality of radially outwardly opening and circumferentially adjacent pockets adapted to be sequentially presented to said inlet and said outlet, a porous liner seated in each pocket for freely passing gases therethrough while retaining material to be transferred therein, said liners being continuously interconnected and having radially outermost peripheral surface portions forming seals with said housing between said inlet and said outlet, other sealing means forming seals between the ends of said rotor and said housing, and a stator fixedly carried by said housing and telescoped within said rotor in sealed relation, said stator being in the form of a valve for selectively varying the pressure within said pockets.

8. The feeder of claim 7 wherein said liners are separately formed and bonded in situ about said rotor.

9. The feeder of claim 8 wherein said other sealing means include fixed continuous sealing members carried by said housing at opposite ends of said chamber, said sealing members being in compressed engagement with ends of said rotor.

10. The feeder of claim 8 wherein said stator is formed of a stable plastic material, and said rotor having an inner sleeve contacting said stator.